US009722758B2

(12) United States Patent
Ding et al.

(10) Patent No.: US 9,722,758 B2
(45) Date of Patent: Aug. 1, 2017

(54) CHANNEL-QUALITY ESTIMATION FOR A WIRELESS CHANNEL

(71) Applicant: Hong Kong Applied Science and Technology Research Institute Company Limited, Hong Kong (HK)

(72) Inventors: Jiewei Ding, Shenzhen (CN); Man Wai Kwan, Hong Kong (HK); Jihui Zhang, Hong Kong (HK); Kong Chau Tsang, Hong Kong (HK)

(73) Assignee: Hong Kong Applied Science and Technology Research Institute Company Limited, Hong Kong (HK)

( * ) Notice: Subject to any disclaimer, the term of this patent is extended or adjusted under 35 U.S.C. 154(b) by 275 days.

(21) Appl. No.: 14/716,887

(22) Filed: May 20, 2015

(65) Prior Publication Data
US 2016/0344488 A1 Nov. 24, 2016

(51) Int. Cl.
H04B 17/336 (2015.01)
H04W 72/04 (2009.01)
H04W 72/08 (2009.01)
H04L 5/00 (2006.01)

(52) U.S. Cl.
CPC .......... *H04L 5/0057* (2013.01); *H04L 5/0044* (2013.01)

(58) Field of Classification Search
None
See application file for complete search history.

(56) References Cited

U.S. PATENT DOCUMENTS

| 5,323,421 A | * | 6/1994 | LaRosa | ............... H04B 1/1027 375/224 |
| 7,983,223 B2 | | 7/2011 | Jung et al. | |
| 8,121,552 B2 | | 2/2012 | Agami et al. | |

(Continued)

FOREIGN PATENT DOCUMENTS

CN 101827389 B 9/2013

OTHER PUBLICATIONS

Haghighat, A., Zhang, G., and Lin, Z., "Full-Band CQI Feedback by Haar Compression in OFDMA Systems," Proceedings of 2009 IEEE 70th Vehicular Technology Conference Fall (VTC 2009-Fall), pp. 1-5, Sep. 20-23, 2009.

*Primary Examiner* — Steve Young
(74) *Attorney, Agent, or Firm* — Spruson & Ferguson (Hong Kong) Limited (57) ABSTRACT

This invention provides a method for a first communication device, such as a base station, to estimate a channel-quality profile of a channel when a second communication device, e.g., a user equipment, returns only channel-quality indicators (CQIs) of selected subbands and a wideband CQI. The profile is obtained by including, for any two neighboring frequencies of the selected subbands, an estimated CQI of a middle frequency between the two neighboring frequencies. After translating the CQIs of the two neighboring frequencies into corresponding linear CQI values, a linear estimated-CQI value for the middle frequency is determined by subtracting an offset from an average of said corresponding linear CQI values. The offset is determined according to a frequency separation between the two neighboring frequencies. Preferably, the offset is linearly proportional to the frequency separation. Interpolation, preferably linear interpolation, is used to obtain linear CQI values of other frequencies.

20 Claims, 5 Drawing Sheets

First Communication Device
Example: Base station

Second Communication Device
Examples: User equipment; Mobile phone; Tablet (56) References Cited

U.S. PATENT DOCUMENTS

| | | | |
|---|---|---|---|
| 8,185,057 B2* | 5/2012 | Molnar | H04W 24/10 455/67.11 |
| 8,355,340 B2* | 1/2013 | Zhu | H04L 1/20 370/252 |
| 9,270,413 B2* | 2/2016 | Qian | H04L 1/0026 |
| 2004/0082356 A1* | 4/2004 | Walton | H04B 7/022 455/522 |
| 2008/0207135 A1 | 8/2008 | Varadarajan et al. | |
| 2009/0080341 A1* | 3/2009 | Takashima | H04L 5/0007 370/252 |
| 2009/0154588 A1* | 6/2009 | Chen | H04L 1/0026 375/267 |
| 2010/0167773 A1* | 7/2010 | Oota | H04B 17/309 455/517 |
| 2010/0254469 A1* | 10/2010 | Luschi | H04L 1/0026 375/260 |
| 2011/0170449 A1* | 7/2011 | Qian | H04L 1/0026 370/252 |
| 2012/0300661 A1 | 11/2012 | Asplund et al. | |
| 2012/0327874 A1 | 12/2012 | Eriksson et al. | |
| 2014/0098663 A1 | 4/2014 | Vos et al. | |
| 2015/0117327 A1* | 4/2015 | Nordstrom | H04W 72/082 370/329 |
| 2015/0282202 A1* | 10/2015 | Miao | H04L 1/00 370/329 |

\* cited by examiner

FIG. 1 (Related Art)

*LTE system as an example*

CHANNEL-QUALITY ESTIMATION FOR A WIRELESS CHANNEL

FIELD OF THE INVENTION

The present invention relates to channel-quality estimation for a wireless communication in a mobile communication system, where the estimated channel quality is usable for a communication device to allocate frequency resources of the wireless channel in data transmission.

BACKGROUND

In mobile communications, a wideband wireless channel is usually frequency-selective so that deep fade occurs in some portions of the channel bandwidth, making these portions not preferable for use in data transmission. Therefore, adaptive allocation of frequency resources of the channel for data transmission is usually employed in mobile communication systems. Performing this allocation requires a knowledge of the channel quality.

Figure 1:
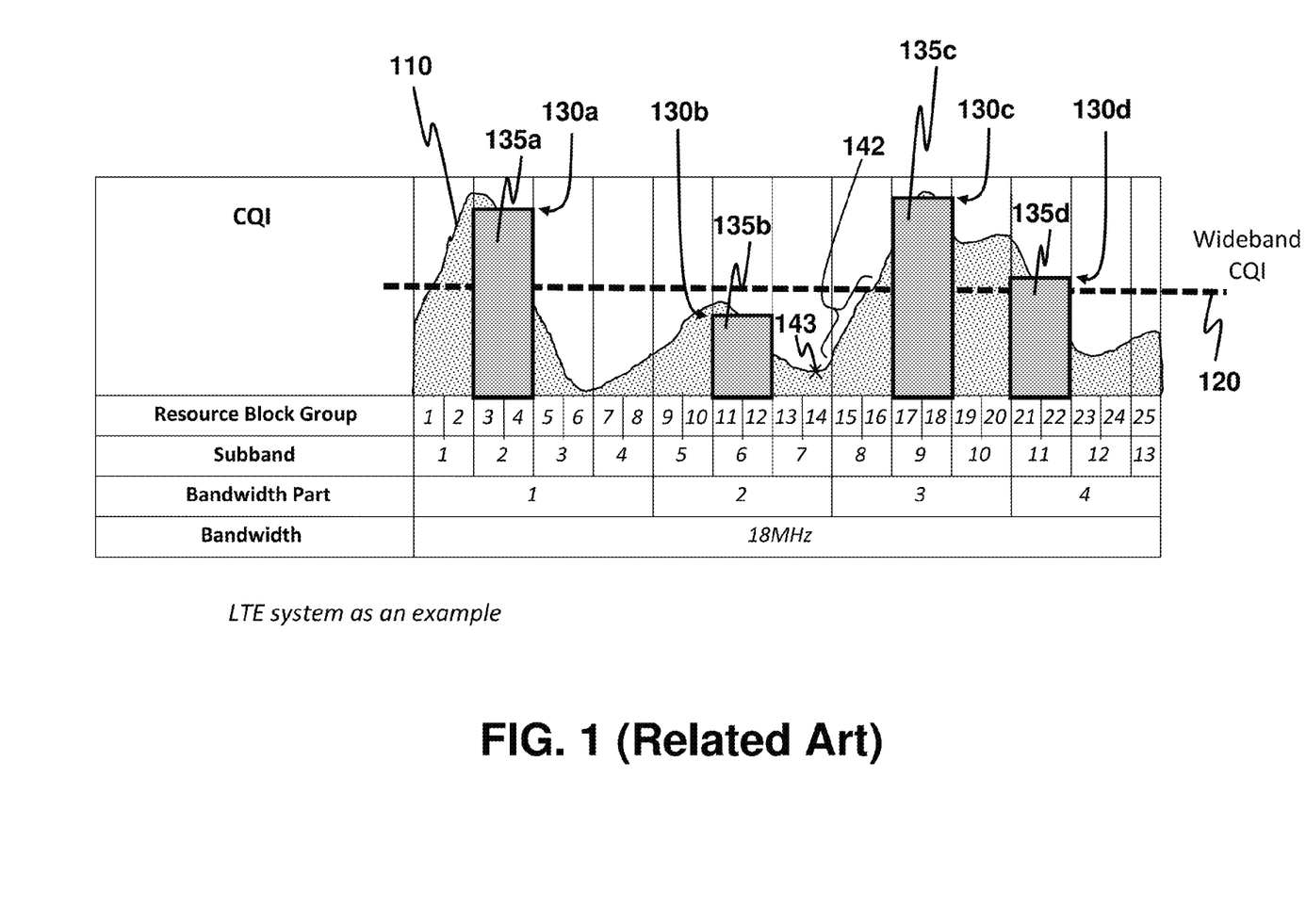
FIG. 1 shows an example of channel-quality information received by a BS from a UE in a LTE system.

As an example, FIG. 1 depicts the channel-quality information received by a base station (BS) from a user equipment (UE) in a LTE system, where the BS employs this information to perform frequency-resource allocation. The BS first sends a reference signal to the UE via a downlink channel. Based on the received reference signal, the UE estimates a frequency response 110 of the channel over the bandwidth. In the LTE system, the channel bandwidth is partitioned into bandwidth parts each having one or more subbands. Each subband is subdivided into resource block groups (RBGs) each having a certain bandwidth. Based on the frequency response 110, the UE computes a channel-quality indicator (CQI), as defined in the LTE specification, for each subband. The UE also computes a wideband CQI 120 representing an average CQI over the channel bandwidth. The UE feedbacks the channel-quality information via an uplink channel, which may be different from the downlink channel in frequency. In order to save radio resources of the uplink channel, the LTE specification specifies a limited amount of channel-quality information to be sent to the BS. The UE only sends the wideband CQI 120 and CQIs 130a-d of selected subbands 135a-d, where each of the selected-subband CQIs 130a-d is the highest CQI among the one or more subbands of one bandwidth part. The BS is required to allocate the frequency resources of the downlink channel based on the limited channel-quality information.

Although one simple allocation strategy is to use only the selected subbands reported by the UE, as is taught by US20140098663, it is more desirable if the BS can estimate CQIs of all the subbands before frequency-resource allocation. US20120327874 suggests a method to estimate CQIs of all the subbands by having that within one bandwidth part, the CQI of the selected subband therein (e.g., the CQI 103b of subband no. 6 of bandwidth part no. 2) is retained while CQIs of remaining subbands (subbands no. 5 and 7) are assigned a value of the wideband CQI 120 plus or minus a certain margin. This method assumes flatness of the estimated CQIs in non-selected subbands over a bandwidth part. However, this approach leads a large error between the measured CQI and the estimated one in the presence of a large roll-off in CQI, such as the large roll-off 142 in the frequency response 110 shown in FIG. 1.

There is a need in the art for a technique used in the BS to estimate CQIs of all subbands based on the limited channel-quality information returned by the UE while the large roll-off problem can be alleviated. The estimated CQIs of all the subbands are useful for adaptive allocation of frequency resources of the channel.

SUMMARY OF THE INVENTION

The present invention provides a method for allocating frequency resources of a wireless channel on which a first communication device communicates with a second communication device, where the method comprises estimating, by the first communication device, a channel-quality profile over a pre-determined bandwidth of the channel. The profile comprises CQIs at plural frequencies. The bandwidth comprises plural bandwidth parts each of which comprises one or more subbands. Each subband has a nominal frequency. The channel bandwidth is bounded by a lower band-edge frequency and an upper band-edge frequency.

The estimating of the profile by the first communication device comprises receiving, from the second communication device, a wideband CQI of the channel and a plurality of CQIs of selected subbands. The first part of the profile is then formed by: incorporating into the profile the plurality of selected-subband CQIs with the nominal frequencies of the selected subbands; assigning to the profile a value of the wideband CQI for the lower band-edge frequency when the nominal frequencies of the selected subbands do not include the lower band-edge frequency; and assigning to the profile a value of the wideband CQI for the upper band-edge frequency when the nominal frequencies of the selected subbands do not include the upper band-edge frequency. Afterwards, a second part of the profile is formed by including, for each pair of two neighboring frequencies belonged to the first part of the profile, a first estimated CQI for a middle frequency between the two neighboring frequencies.

The first estimated CQI is determined by a first estimation subprocess that comprises first translating each of the CQIs obtained in the first part of the profile to a corresponding linear CQI value. Denote a first linear CQI value and a second linear CQI value as the two corresponding linear CQI values for the two neighboring frequencies respectively. A linear first-estimated-CQI value for the middle frequency is determined by subtracting an offset from an average of the first and the second CQI values. In particular, the offset is determined according to a frequency separation between the two neighboring frequencies. Preferably, the offset is linearly proportional to the frequency separation. Thereafter, the linear first-estimated-CQI value is obtainable by translating the linear first-estimated-CQI value to the first estimated CQI.

The estimating of the profile further comprises forming a third part of the profile by including a second estimated CQI of a targeted frequency that is not any frequency belonged to the first or the second part of the profile. The second estimated CQI is determined by a second estimation subprocess that comprises interpolating two or more of linear CQI values translated from the CQIs that are belonged to the first or the second part of the profile. Preferably, a linear interpolation algorithm is used to determine the linear second-estimated-CQI value. The second estimated CQI is obtainable by translating the linear second-estimated-CQI value to the second estimated CQI.

The disclosed method is implementable in a BS comprising a radio transceiver and one or more processors.

Other aspects of the present invention are disclosed as illustrated by the embodiments hereinafter.

DETAILED DESCRIPTION

The present invention is concerned with a method for estimating a channel-quality profile for a wireless channel based on limited channel-quality information.

Figure 2:
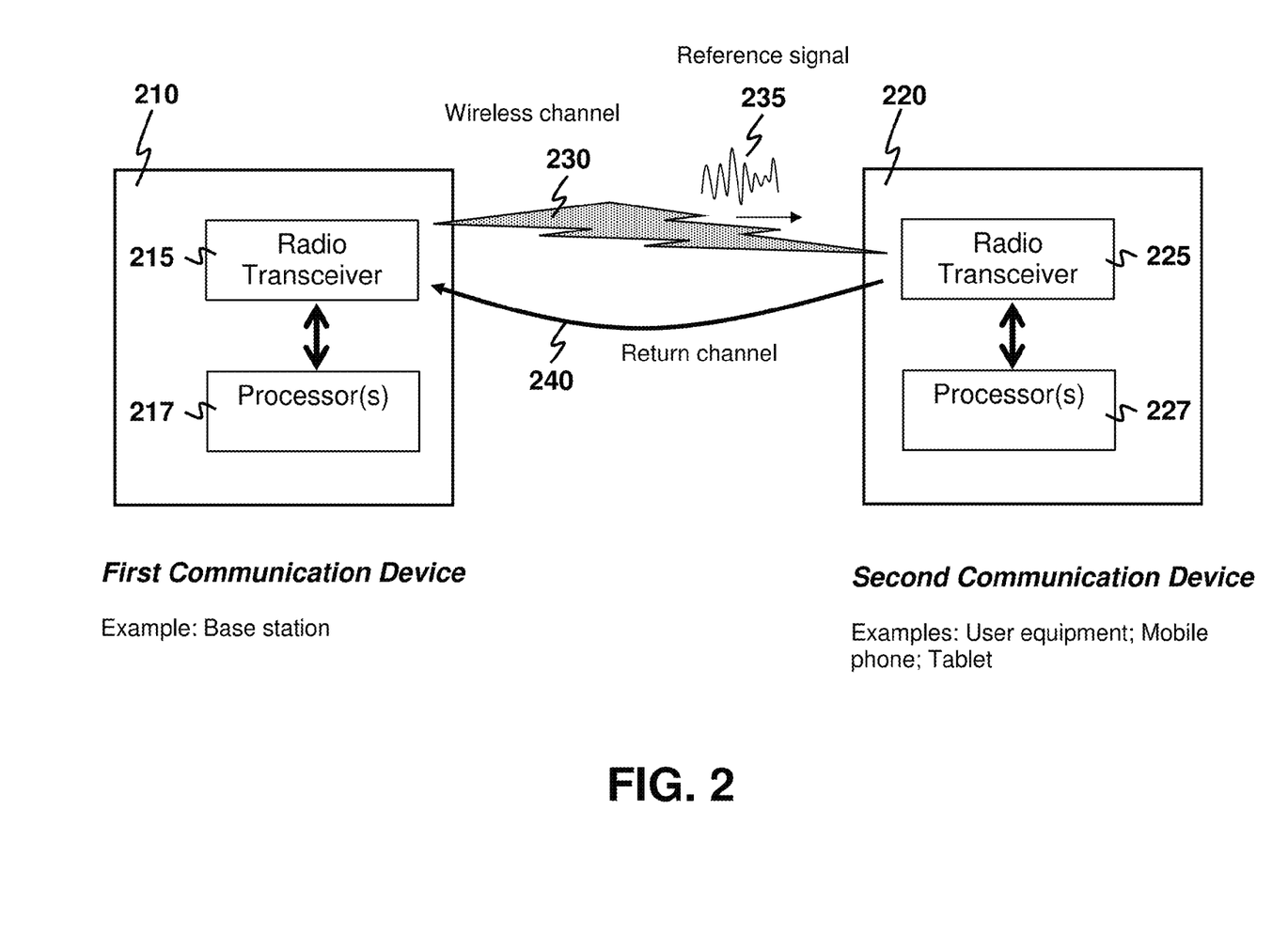
FIG. 2 depicts, in accordance with an embodiment of the present invention, a first communication device transmitting a reference signal to a second communication device via a wireless channel, and the second communication device returning limited channel-quality information to the first communication device.

Before details of the present invention are elaborated, a hardware setting on which the method can be implemented is illustrated with an aid of FIG. 2, where a first communication device 210 is desired to obtain limited channel-quality information from a second communication device 220. In a mobile communication system, the first communication device 210 is usually a BS while the second communication device 220 may be a UE in general, or a mobile phone, or a tablet having wireless-communication capability. The first communication device 210 comprises a first radio transceiver 215 and one or more first processors 217. The first radio transceiver 215 sends a reference signal 235 via a wireless channel 230, e.g., a downlink channel when the first communication device 210 is a BS, to the second communication device 220. The reference signal 235 is received at the second communication device 220 by a second radio transceiver 225 therein. In the second communication device 220, the received reference signal 235 is then analyzed by one or more second processors 227 to yield complete channel-quality information, which includes CQIs of all subbands. The second radio transceiver 225 returns limited channel-quality information, which includes only a part of the complete channel-quality information, to the first communication device 210 via a return channel 240, which may be an uplink channel if the second communication device 220 is a UE in a mobile communication system. Upon receipt of the limited channel-quality information by the first radio transceiver 215, the one or more first processors 217 process this limited information to estimate the channel-quality profile by an embodiment of the method disclosed in the present invention.

An aspect of the present invention is to provide a method for allocating frequency resources of a wireless channel on which a first communication device communicates with a second communication device, where the method comprises estimating, by the first communication device, a channel-quality profile over a pre-determined bandwidth of the channel. The profile comprises CQIs at plural frequencies. The channel bandwidth comprises plural bandwidth parts each comprising one or more subbands. Each subband has a nominal frequency. This nominal frequency is usually selected to be a center frequency of the subband for most mobile communication systems, although it can be chosen to be any frequency within the subband. The channel bandwidth is bounded by a lower band-edge frequency and an upper band-edge frequency.

Figure 3:
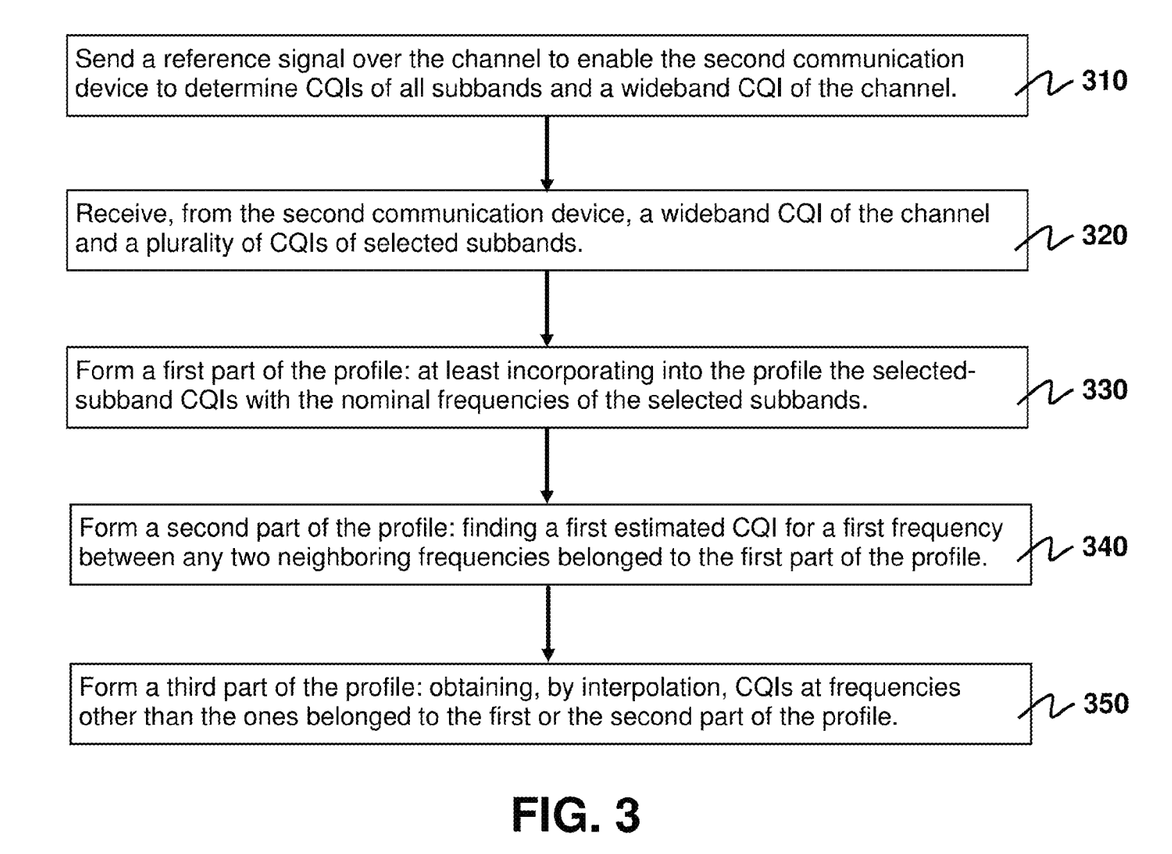
FIG. 3 depicts the steps of estimating a channel-quality profile by the first communication device according to an exemplary embodiment of the present invention.

FIG. 3 depicts the steps in the estimating of the channel-quality profile according to an exemplary embodiment of the present invention.

The first communication device first sends a reference signal over the channel to the second communication device so as to enable the second communication device to determine CQIs of all the subbands over the channel bandwidth as well as a wideband CQI of the channel (step 310). The wideband CQI is an average CQI over the channel bandwidth.

From the second communication device, the first communication device receives the wideband CQI and a plurality of CQIs of selected subbands (step 320) as limited channel-quality information. In particular, the selected subbands are distinct so that the nominal frequencies of these selected subbands are different among each other. Preferably, although not strictly required by the disclosed method, each of the selected-subband CQIs is the highest CQI, as measured by the second communication device, among the one or more subbands of one of the bandwidth parts.

Then a first part of the profile is formed (step 330) by incorporating into the profile the plurality of selected-subband CQIs with the nominal frequencies of the selected subbands. When the nominal frequencies of the selected subbands do not include the lower band-edge frequency, one option is to assign to the profile a value of the wideband CQI for the lower band-edge frequency. Similarly, it is optional to assign to the profile a value of the wideband CQI for the upper band-edge frequency when such nominal frequencies do not include the upper band-edge frequency.

Afterwards, a second part of the profile is formed (step 340). In the step 340, all the frequencies that were involved in forming the first part of the profile are first arranged or sorted in order. The second part of the profile is formed by including, for each pair of two neighboring frequencies belonging to the first part of the profile, a first estimated CQI for a middle frequency between the two neighboring frequencies. The middle frequency is such that it is equidistant between the two neighboring frequencies. Using the middle frequency is potentially advantageous because it usually results in simplicity in digital implementation of the method at a processing unit of the first communication device (e.g., the one or more first processors 217 in FIG. 2).

The forming of the second part of the profile in the step 340 is an important step for alleviating the large roll-off problem. Refer to FIG. 1. The selected subbands after arranged in the order of their nominal frequencies are referenced by numerals 135a-d. The inventors make the following observation. Since each of the selected subbands 135a-d is generally the highest CQI among all the subbands in one bandwidth part, original CQI values, measured by the second communication device, of subbands between any two neighboring selected subbands are in most cases not greater than at least the CQI of one of the two neighboring selected subbands, as evidenced from the frequency response 110. Take the frequency response 110 as an example. Between the subbands 135b and 135c, the frequency response 110 is concave. To more accurately estimate CQIs of subbands in between the two subbands 135*b*, 135*c*, having a knowledge of an inflection point 143 is advantageous. This inflection point 143, however, is generally not estimable based on the limited channel-quality information. The inventors have observed that an inflection point is in general close to a middle frequency of two neighboring selected subbands. It forms the basis for the present invention to select the middle frequency in obtaining the first estimated CQI. If the first estimated CQI is sufficiently lower than, for example, one or both of the CQIs of the two neighboring selected subbands, the channel-quality profile between the two neighboring selected subbands becomes concave in shape, thus alleviating the large roll-off problem. The CQI for a frequency between the middle frequency and one of the neighboring selected subbands may be obtained by interpolation. Based on the aforementioned observation, the first estimated CQI is determined as follows.

First, each of the CQIs obtained in the first part of the profile is translated to a corresponding linear CQI value. As used herein, a linear CQI value is a non-negative number that is linearly proportional to a measure of channel quality, such as a channel power gain or a signal-to-interference-plus-noise ratio (SINR), at a particular frequency or over a given bandwidth. It is also used herein in the specification and appended claims that "translating" from a CQI to a linear CQI value or vice versa has an implication that both the aforesaid CQI and linear CQI value are equivalent in the sense that they express the same degree of channel quality. If a CQI already fits the aforementioned meaning of a linear CQI value, the aforesaid step of translation is simply to put the CQI as the linear CQI value. However, in most of mobile-communication standards such as the LTE standard, a CQI is a measure of channel quality in a logarithmic scale rather than a linear scale. In one embodiment, the translating of an individual CQI obtained in the first part of the profile to a corresponding linear CQI value is performed as follows. The individual CQI is first converted to a spectrum efficiency according to a pre-selected mapping scheme. The spectrum efficiency is then converted to a SINR in a linear scale according to the pre-selected mapping scheme, whereby the SINR is regarded as the corresponding linear CQI value. If the first and the second communication devices are operated in a LTE system, this pre-selected mapping scheme is based on the LTE specification.

Second, a linear first-estimated-CQI value for the middle frequency is determined. Denote a first linear CQI value and a second linear CQI value as the two corresponding linear CQI values for the two neighboring frequencies respectively. An average value computed by averaging the first and the second CQI values is obtained. Then a certain offset is subtracted from this average value to yield the linear first-estimated-CQI value. According to an exemplary embodiment of the present invention, this offset is determined according to a frequency separation between the two neighboring frequencies. In particular, the offset is a function of the frequency separation. Preferably, it is a linear function so that the offset is linearly proportional to the frequency separation. Note that the function is required to adapt to actual numerical figures of the linear CQI values of the selected subbands in order that the channel-quality profile as estimated does not become negative in any part thereof. Also note that the offset is a positive quantity as the frequency separation is non-zero. The first estimated CQI is obtainable from the linear first-estimated-CQI value by translating the linear first-estimated-CQI value to the first estimated CQI. Similarly to what is mentioned above, if the first estimated CQI is defined to have a numerical value linearly proportional to a measure of channel quality, the aforementioned step of translating is simply to put the linear first-estimated-CQI value as the first estimated CQI.

Figure 4:
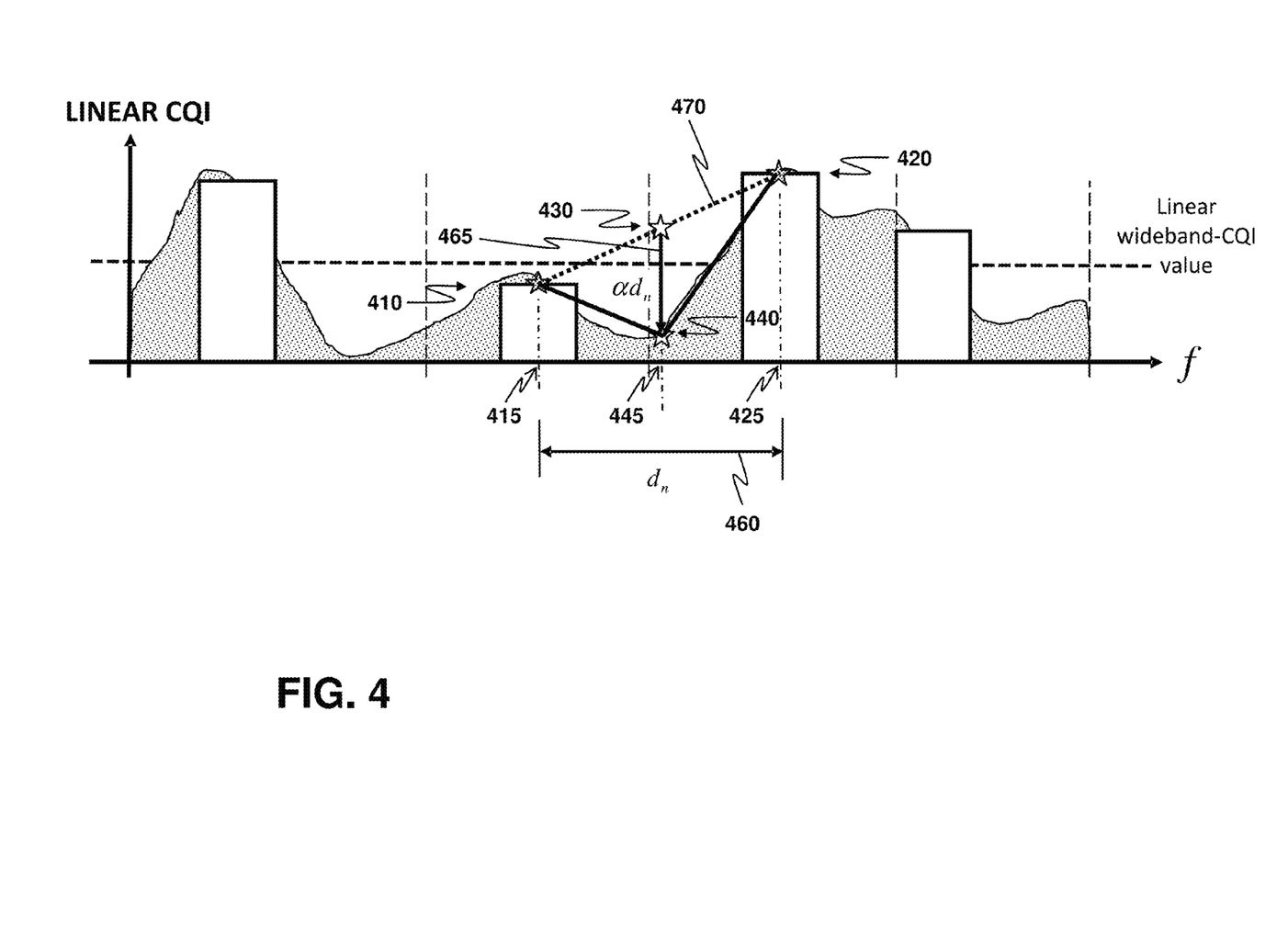
FIG. 4 illustrates, in accordance with the exemplary embodiment, an approach for estimating the CQIs for frequencies between two selected subbands, where the two selected subbands have their CQIs reported in the limited channel-quality information.

An exemplary embodiment of determining the linear first-estimated-CQI value for the middle frequency is detailed as follows with an aid of FIG. 4, which is a linear-CQI-versus-frequency graph. Without loss of generality, the two neighboring frequencies belonging to the first part of the profile are designated as frequencies $x_n$ 415 and $x_{n+1}$ 425. The frequency separation 460, denoted as $d_n$, between the two neighboring frequencies 415, 425 is given by $$d_n = x_{n+1} - x_n.$$

The frequencies $x_n$ 415 and $x_{n+1}$ 425 have linear CQI values $y_n$ 410 and $y_{n+1}$ 420, respectively. It is desired to estimate a linear first-estimated-CQI value $y'_n$ 440 at the middle frequency $x'_n$ 445 where $$x'_n = (x_n + x_{n+1})/2.$$

The estimation procedure is as follows. A straight line 470 between the two coordinates $(x_n, y_n)$ and $(x_{n+1}, y_{n+1})$ is first constructed. At the middle frequency $x'_n$ 445, a linear CQI value $\bar{y}_n$ 430 on the line 470 is found to be $\bar{y}_n = (y_n + y_{n+1})/2$, i.e. the average of the linear CQI values of the two neighboring frequencies. The linear first-estimated-CQI value $y'_n$ 440 is given by the value $\bar{y}_n$ 430 minus an offset 465 of length $\alpha \times d_n$ where $\alpha$ is a scaling factor. It follows that $$y'_n = (y_n + y_{n+1})/2 - \alpha d_n.$$

It is apparent that the linear first-estimated-CQI value 440 is determined according to the frequency separation 460. Furthermore, the arrangement of the coordinates $(x_n, y_n)$, $(x_{n+1}, y_{n+1})$ and $(x'_n, y'_n)$ makes the estimated channel-quality profile look like a "tick" shape. The remaining problem is to determine $\alpha$. Note that a unique $\alpha$ is used for any two neighboring frequencies belonging to the first part of the profile. A procedure for determining $\alpha$ will be given later.

Refer to FIG. 3. After forming the second part of the profile in the step 340, a third part of the profile is obtained (step 350) by including a second estimated CQI for a targeted frequency that is not any frequency belonged to the first or the second part of the profile. One or more estimated CQIs obtained by an approach substantially similar to obtaining the second estimated CQI may be further included in the third part of the profile. The determination of the second estimated CQI is as follows. First, determine a linear second-estimated-CQI value for the targeted frequency by interpolating two or more of linear CQI values equivalent to the CQIs that are belonged to the first or the second part of the profile. Although any interpolation scheme can be used, it is preferable to use a linear interpolation algorithm because of its computational simplicity. Second, the linear second-estimated-CQI value is translated to the second estimated CQI. Again, if the second estimation CQI is defined to have a numerical value linearly proportional to a measure of channel quality, the aforementioned step of translating is simply to put the linear second-estimated-CQI value as the second estimated CQI.

Figure 5:
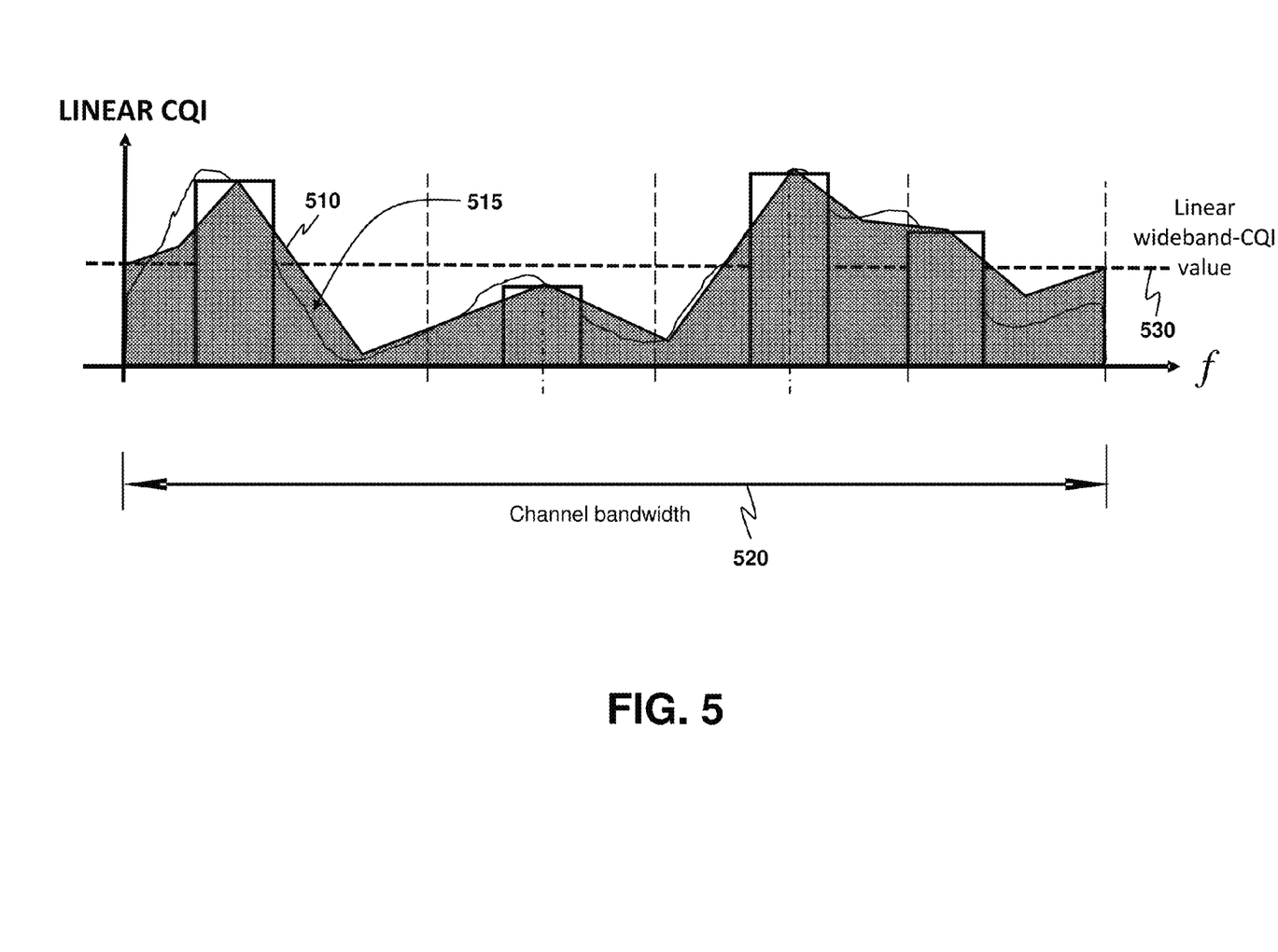
FIG. 5 depicts the estimated channel-quality profile in linear CQI value for all the frequencies over the channel bandwidth based on the approach shown in FIG. 4.

FIG. 5 is a linear-CQI-versus-frequency graph depicting an estimated channel-quality profile 510 represented by linear CQI values for all the frequencies over a channel bandwidth 520. Linear interpolation is used to obtain linear CQI values in the third part of the profile 510. Under this situation of using linear interpolation, the determination of the scaling factor $\alpha$ is as follows. It is first noticed that an average value of the linear CQI values over the channel bandwidth 520 should be equal to a linear wideband-CQI value 530. Therefore, $\alpha$ is determined under a constraint that in the linear-CQI-versus-frequency graph, an area 515 under the channel-quality profile 510 and within the channel bandwidth 520 is equal to the linear wideband-CQI value 530 multiplied by the channel bandwidth 520. Let N be the number of frequencies that form the first part of the profile, so there are N ordered pairs, $(x_n, y_n)$ for $n=1, 2, \ldots, N$, where $x_n$ is the nth frequency in the first part of the profile, and $y_n$ is the corresponding linear CQI value of $x_n$. Furthermore, $x_1 < x_2 < \ldots < x_N$. After some algebraic manipulations, one can find that $\alpha$ is given by $$\alpha = \frac{\sum_{n=1}^{N-1} d_n \times [y_{n+1} + y_n] - 2 \times B \times P}{\sum_{n=1}^{N-1} d_n^2}$$

where B is the channel bandwidth, P is the linear wideband-CQI value, and $d = x_{n+1} - x_n$ is a frequency separation between $x_n$ and $x_{n+1}$.

After the channel-quality profile is estimated, a part of the frequency resources can be selected according to an entirety of the CQIs recorded in the profile. Thereby, the first communication device may communicate with the second device over the selected part of the frequency resources.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure.

The present invention may be embodied in other specific forms without departing from the spirit or essential characteristics thereof. The present embodiment is therefore to be considered in all respects as illustrative and not restrictive. The scope of the invention is indicated by the appended claims rather than by the foregoing description, and all changes that come within the meaning and range of equivalency of the claims are therefore intended to be embraced therein.

What is claimed is:

1. A method for allocating frequency resources of a wireless channel on which a first communication device communicates with a second communication device, the method comprising estimating, by the first communication device, a channel-quality profile over a pre-determined bandwidth of the channel, the profile comprising channel-quality indicators (CQIs) at plural frequencies, the channel bandwidth comprising plural subbands each having a nominal frequency, wherein:

the estimating of the profile comprises:
receiving, from the second communication device, a wideband CQI of the channel and a plurality of CQIs of selected subbands;
forming a first part of the profile, wherein the forming of the first part of the profile comprises incorporating into the profile the plurality of selected-subband CQIs with the nominal frequencies of the selected subbands;
forming a second part of the profile by including, for each pair of two neighboring frequencies belonged to the first part of the profile, a first estimated CQI of a middle frequency between the two neighboring frequencies; and
forming a third part of the profile, wherein the forming of the third part of the profile comprises including a second estimated CQI of a targeted frequency that is not any frequency belonged to the first or the second part of the profile;

the first estimated CQI is determined by a first estimation subprocess comprising:
translating each of the CQIs obtained in the first part of the profile to a corresponding linear CQI value, whereby the two neighboring frequencies respectively have a first linear CQI value and a second linear CQI value; and
determining a linear first-estimated-CQI value for the middle frequency by subtracting an offset from an average of the first and the second CQI values, wherein the offset is determined according to a frequency separation between the two neighboring frequencies, whereby the first estimated CQI is obtainable by translating the linear first-estimated-CQI value to the first estimated CQI; and the second estimated CQI is determined by a second estimation subprocess comprising:
determining a linear second-estimated-CQI value for the targeted frequency by interpolating two or more of linear CQI values translated from the CQIs that are belonged to the first or the second part of the profile, whereby the second estimated CQI is obtainable by translating the linear second-estimated-CQI value to the second estimated CQI.

2. The method of claim 1, wherein the offset is linearly proportional to the frequency separation.

3. The method of claim 1, wherein the channel bandwidth is bounded by a lower band-edge frequency and an upper band-edge frequency, and wherein the forming of the first part of the profile further comprises:
assigning to the profile a value of the wideband CQI for the lower band-edge frequency when the nominal frequencies of the selected subbands do not include the lower band-edge frequency; and
assigning to the profile a value of the wideband CQI for the upper band-edge frequency when the nominal frequencies of the selected subbands do not include the upper band-edge frequency.

4. The method of claim 1, wherein a linear interpolation algorithm is used to determine the linear second-estimated-CQI value.

5. The method of claim 1, wherein the estimating of the profile further comprises:
sending a reference signal over the channel to the second communication device so as to enable the second communication device to determine CQIs of all the subbands over the channel bandwidth as well as the wideband CQI.

6. The method of claim 1, wherein:
the channel bandwidth is partitioned into plural bandwidth parts each having one or more of the subbands; and
the CQI of an individual selected subband is the highest CQI among the one or more subbands of a particular bandwidth part that includes said individual selected subband.

7. The method of claim 1, wherein the translating of an individual CQI obtained in the first part of the profile to a corresponding linear CQI value comprises:
converting the individual CQI to a spectrum efficiency according to a pre-selected mapping scheme; and
converting the spectrum efficiency to a signal-to-interference-plus-noise ratio (SINR) in a linear scale according to the pre-selected mapping scheme, whereby the SINR is regarded as the corresponding linear CQI value.

8. The method of claim 7, wherein the pre-selected mapping scheme is based on the LTE specification.

9. The method of claim 1, wherein the first communication device is a base station.

10. The method of claim 1, further comprising:
selecting a part of the frequency resources according to an entirety of the CQIs recorded in the profile such that the first communication device communicates with the second communication device over the selected part of the frequency resources.

11. A base station for communicating with a user equipment over a wireless channel, comprising:
one or more processors configured to execute a process for estimating a channel-quality profile over a predetermined bandwidth of the channel, the profile comprising channel-quality indicators (CQIs) at plural frequencies, the channel bandwidth comprising plural subbands each having a nominal frequency; and
a radio transceiver configured to receive, from the user equipment, a wideband CQI of the channel and a plurality of CQIs of selected subbands;
wherein:
the process comprises:
forming a first part of the profile, wherein the forming of the first part of the profile comprises incorporating into the profile the plurality of selected-subband CQIs with the nominal frequencies of the selected subbands;
forming a second part of the profile by including, for each pair of two neighboring frequencies belonged to the first part of the profile, a first estimated CQI of a middle frequency between the two neighboring frequencies; and
forming a third part of the profile, wherein the forming of the third part of the profile comprises including a second estimated CQI of a targeted frequency that is not any frequency belonged to the first or the second part of the profile;
the first estimated CQI is determined by a first estimation subprocess comprising:
translating each of the CQIs obtained in the first part of the profile to a corresponding linear CQI value, whereby the two neighboring frequencies respectively have a first linear CQI value and a second linear CQI value; and
determining a linear first-estimated-CQI value for the middle frequency by subtracting an offset from an average of the first and the second CQI values, wherein the offset is determined according to a frequency separation between the two neighboring frequencies, whereby the first estimated CQI is obtainable by translating the linear first-estimated-CQI value to the first estimated CQI; and
the second estimated CQI is determined by a second estimation subprocess comprising:
determining a linear second-estimated-CQI value for the targeted frequency by using a linear interpolation algorithm to interpolate two of linear CQI values translated from the CQIs that are belonged to the first or the second part of the profile, whereby the second estimated CQI is obtainable by translating the linear second-estimated-CQI value to the second estimated CQI.

12. The base station of claim 11, wherein the offset is linearly proportional to the frequency separation.

13. The base station of claim 11, wherein the channel bandwidth is bounded by a lower band-edge frequency and an upper band-edge frequency, and wherein the forming of the first part of the profile further comprises:
assigning to the profile a value of the wideband CQI for the lower band-edge frequency when the nominal frequencies of the selected subbands do not include the lower band-edge frequency; and
assigning to the profile a value of the wideband CQI for the upper band-edge frequency when the nominal frequencies of the selected subbands do not include the upper band-edge frequency.

14. The base station of claim 11, wherein the translating of an individual CQI obtained in the first part of the profile to a corresponding linear CQI value comprises:
converting the individual CQI to a spectrum efficiency according to a pre-selected mapping scheme; and
converting the spectrum efficiency to a signal-to-interference-plus-noise ratio (SINR) in a linear scale according to the pre-selected mapping scheme, whereby the SINR is regarded as the corresponding linear CQI value.

15. The base station of claim 14, wherein the pre-selected mapping scheme is based on the LTE specification.

16. The base station of claim 11, wherein the linear first-estimated-CQI value, $y'_n$, is determined according to $$y'_n = (y_n + y_{n+1})/2 - \alpha(x_{n+1} - x_n)$$

where:
$x_n$ and $x_{n+1}$, in which $x_{n+1} > x_n$, denote the two neighboring frequencies;
$y_n$ denotes the first linear CQI value, which is obtained for $x_n$;
$y_{n+1}$ denotes the second linear CQI value, which is obtained for $x_{n+1}$; and
$\alpha$ is a scaling factor;
and wherein $$\alpha = \frac{\sum_{n=1}^{N-1} d_n \times [y_{n+1} + y_n] - 2 \times B \times P}{\sum_{n=1}^{N-1} d_n^2}$$

where:
N is the number of frequencies that form the first part of the profile;
$x_n$, $1 \le n \le N$, is the nth frequency in the first part of the profile, the N values of $x_n$ being arranged such that $x_1 < x_2 < \ldots < x_N$;
$y_n$, $1 \le n \le N$, is a linear CQI value corresponding to the CQI of $x_n$;
B is the channel bandwidth;
P is a linear wideband-CQI value obtained by translating the wideband CQI; and $$d_n = x_{n+1} - x_n.$$

17. The base station of claim 11, wherein the offset is determined by multiplying the frequency separation with a scaling factor, the scaling factor being determined such that, in a linear-CQI-versus-frequency graph, an area under the channel-quality profile in linear CQI value and within the channel bandwidth is equal to a value given by multiplying the channel bandwidth with a linear wideband-CQI value obtained by translating the wideband CQI.

18. The base station of claim 11, wherein a linear interpolation algorithm is used to determine the linear second-estimated-CQI value.

19. A method for allocating frequency resources of a wireless channel on which a first communication device communicates with a second communication device, the method comprising estimating, by the first communication device, a channel-quality profile over a pre-determined bandwidth of the channel, the profile comprising channel-quality indicators (CQIs) at plural frequencies, the channel bandwidth comprising plural subbands each having a nominal frequency, wherein:

the estimating of the profile comprises:
  receiving, from the second communication device, a wideband CQI of the channel and a plurality of CQIs of selected subbands;
  forming a first part of the profile, wherein the forming of the first part of the profile comprises incorporating into the profile the plurality of selected-subband CQIs with the nominal frequencies of the selected subbands; and
  forming a second part of the profile by including, for each pair of two neighboring frequencies belonged to the first part of the profile, a first estimated CQI of a middle frequency between the two neighboring frequencies; and the first estimated CQI is determined by a first estimation subprocess comprising:
  translating each of the CQIs obtained in the first part of the profile to a corresponding linear CQI value, whereby the two neighboring frequencies respectively have a first linear CQI value and a second linear CQI value; and
  determining a linear first-estimated-CQI value for the middle frequency by subtracting an offset from an average of the first and the second CQI values, whereby the first estimated CQI is obtainable by translating the linear first-estimated-CQI value to the first estimated CQI;

wherein the offset is determined by multiplying a scaling factor with a frequency separation between the two neighboring frequencies, the scaling factor being determined such that, in a linear-CQI-versus-frequency graph, an area under the channel-quality profile in linear CQI value and within the channel bandwidth is equal to a value given by multiplying the channel bandwidth with a linear wideband-CQI value obtained by translating the wideband CQI.

20. A method for allocating frequency resources of a wireless channel on which a first communication device communicates with a second communication device, the method comprising estimating, by the first communication device, a channel-quality profile over a pre-determined bandwidth of the channel, the profile comprising channel-quality indicators (CQIs) at plural frequencies, the channel bandwidth comprising plural subbands each having a nominal frequency, wherein:

the estimating of the profile comprises:
  receiving, from the second communication device, a wideband CQI of the channel and a plurality of CQIs of selected subbands;
  forming a first part of the profile, wherein the forming of the first part of the profile comprises incorporating into the profile the plurality of selected-subband CQIs with the nominal frequencies of the selected subbands; and
  forming a second part of the profile by including, for each pair of two neighboring frequencies belonged to the first part of the profile, a first estimated CQI of a middle frequency between the two neighboring frequencies; and the first estimated CQI is determined by a first estimation subprocess comprising:
  translating each of the CQIs obtained in the first part of the profile to a corresponding linear CQI value, whereby the two neighboring frequencies respectively have a first linear CQI value and a second linear CQI value; and
  determining a linear first-estimated-CQI value for the middle frequency, whereby the first estimated CQI is obtainable by translating the linear first-estimated-CQI value to the first estimated CQI;

wherein the linear first-estimated-CQI value, $y'_n$, is determined according to $$y'_n = (y_n + y_{n+1})/2 - \alpha(x_{n+1} - x_n)$$

where:
  $x_n$ and $x_{n+1}$, in which $x_{n+1} > x_n$, denote the two neighboring frequencies;
  $y_n$ denotes the first linear CQI value, which is obtained for $x_n$;
  $y_{n+1}$ denotes the second linear CQI value, which is obtained for $x_{n+1}$; and
  $\alpha$ is a scaling factor;

and wherein $$\alpha = \frac{\sum_{n=1}^{N-1} d_n \times [y_{n+1} + y_n] - 2 \times B \times P}{\sum_{n=1}^{N-1} d_n^2}$$

where:
  N is the number of frequencies that form the first part of the profile;
  $x_n$, $1 \leq n \leq N$, is the nth frequency in the first part of the profile, the N values of $x_n$ being arranged such that $x_1 < x_2 < \ldots < x_N$;
  $y_n$, $1 \leq n \leq N$, is a linear CQI value corresponding to the CQI of $x_n$;
  B is the channel bandwidth;
  P is a linear wideband-CQI value obtained by translating the wideband CQI; and $$d_n = x_{n+1} - x_n.$$

* * * * *